Patented Dec. 30, 1952

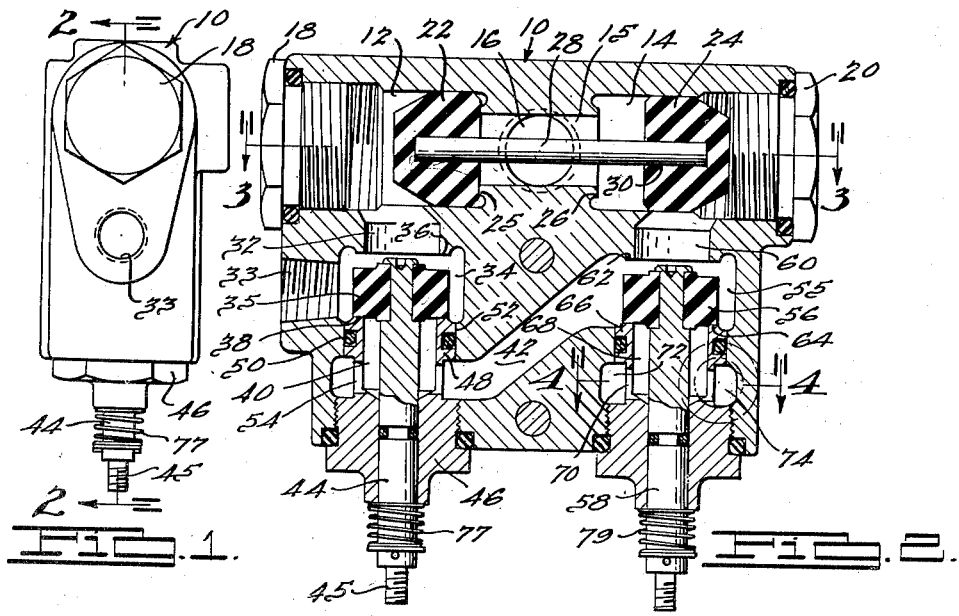

2,623,534

UNITED STATES PATENT OFFICE 2,623,534

VALVULAR CONTROLLING MEANS

Le Roy S. De Mart, Detroit, Mich., assignor to Diamond Power Specialty Corporation, Detroit, Mich., a corporation of Ohio Application November 17, 1948, Serial No. 60,435

9 Claims. (Cl. 137—106)

The present invention relates to controlling means for fluid-operable mechanism. A primary object of the invention is to provide novel and improved valvular controlling means especially adapted to control a sequence of operations as for example to control the times of starting, stopping and reversal, or other changes of driving rate, of fluid motors or other fluid actuated elements adapted to perform in a cyclic or sequential manner.

A more specific object is to provide improved valvular controlling means for fluid actuatable motor means or the like, where the functioning of the controlled device or devices is variable in a predetermined manner or pattern, as for example a controlled fluid motor may be reversible in accordance with the manner of delivery of the actuating fluid thereto, the valvular means of the present invention providing improved, simplified and highly reliable means for controlling the action of such a reversible or other variable drive fluid actuatable motor.

A further object of this invention is to provide improved valvular controlling means whereby the action of a controlled motor may be regulated, for example, to change the direction of drive, in a novel and improved manner, and whereby the fluid which serves to actuate the motor or other driven elements is automatically by-passed through the valve and directed away from the motor when the desired operating cycle of the motor is completed, novel means additionally being provided whereby the valving mechanism may be automatically reset after completion of the operating cycle. By virtue of this arrangement, a motor or other controlled device may be operated automatically through a predetermined cycle, or if desired, supervisory manual control may be exercised in such manner as to change the normal or intended sequence of cyclic operations, but regardless of whether a preceding cycle has been automatically controlled or manually altered or supervised, subsequently initiated cycles of operation will be resumed on the automatically controlled basis each time the mechanism is restarted.

Another important object of the present invention is to provide valvular means for controlling the action of a reversible fluid motor, which valvular means is of very simple, rugged and reliable construction, and which provides for the reversing of a controlled motor or the like merely by the movement of a single valve.

Other objects and advantages will be readily apparent upon consideration of the present disclosure in its entirety.

In the drawings:

Figure 1 is a side elevational view of a valve assembly constructed in accordance with the present invention;

Figure 2 is a vertical sectional view taken substantially on the line 2—2 of Figure 1 but on a somewhat larger scale, and looking in the direction of the arrows;

Figure 3 is a horizontal sectional view taken substantially on the line 3—3 of Figure 2;

Figure 4 is a sectional detailed view taken substantially on the line 4—4 of Figure 2, and looking in the direction of the arrows; and Figure 5 is a schematic diagram.

Referring now to the drawings, reference character 10 designates generally a valve casing of generally flat rectangular form, the valve elements therein being arranged in substantially coplanar relation and being shown as of the poppet type.

A dual valve assembly consisting of valve heads 22, 24 and stem 28 is transversely arranged within one end of the casing. This assembly is shown as near the top in Figure 2, although it will be understood that the valve mechanism is adapted to be used in any position, and that the terms "top," "bottom," "right," "left," etc., are used merely with reference to the positions of the parts as shown on the accompanying drawings. The valve heads 22, 24 are slidable in coaxial cylindrical chambers 12, 14, chamber 12 being located near the left side of the casing, and valve chamber 14 near the right side of the casing. Chambers 12, 14 are joined at their inner ends by a coaxial connecting passage 15 which communicates with an exhaust port 16 which opens through the rear face of the casing. The cylindrical valve chambers 12, 14 are closed at their outer ends as by means of conventional plugs 18 and 20. Valves 22, 24 may be formed of relatively resilient plastic such as synthetic rubber or other suitable material and are adapted to bear against and seal off corresponding opposed seat portions 25, 26, respectively, formed at the inner ends of the chambers 12, 14 and constituting in effect the outer ends of the central passage 15. The valves 22, 24 are mounted upon a common axial valve stem 28 which extends freely through the central passage 15.

Valve chamber 12 is connected at its outer end by a downwardly extending passage 32 to a cylindrical valve chamber 34 which, as shown, may be arranged substantially in axially coplanar relation with respect to chambers 12, 14, 15, but perpendicular to and directly beneath and relatively close to the chamber 12. Valve chamber 34 contains two opposed seats and a vertical poppet valve 35 movable up and down therein to seat either against an upper seat 36 or a lower seat 38. When the valve 35 bears against the upper seat 36, it closes off communication between the inlet 33 formed in the left side of the casing and the passage 32. When valve 35 bears against the lower seat portion 38, it permits such communication but closes off a passage 40 which is open to the inlet when the valve is raised and which extends downwardly from the chamber 34 to communicate with a lateral passage 42 extending transversely of the valve casing. Valve 35 is fast upon a stem 44 which extends downwardly through the bottom of the valve casing and may be provided as at 45 with a threaded or other suitably contoured end portion adapted to be actuated by any suitable apparatus which may be connected thereto, or which may be provided with a button or other suitable means for convenient manual operation of the valve. As shown in the drawings, stem 44 extends through and is sealed with respect to a removable threaded guide bushing 46 which is also tightly fitted in and sealed with respect to the casing and which may be large enough so that the entire valve assembly is removable from the lower end of the casing with the guide bushing. To faciiltate such removal of the valve, the lower seat 38 is formed upon a hollow cylindrical cage 48 which may as shown be formed integrally with the bushing portion 46. Cage portion 48 is provided with a toroidal or other suitable sealing gasket 50 and during installation of the bushing and cage assembly is adapted to slide into sealed engagement with a bore portion 52 formed in the casing above lateral passage 42 as a downward coaxial continuation of the chamber 34. It will be appreciated that by virtue of this arrangement, the entire valve, cage and guide bushing assembly can be inserted in the valve casing as a unit, and removed in like fashion in event of any necessary servicing, inspection or replacement. The cage portion 48 is provided with openings 54 in its lower end to afford communication between space 40 under the valve 35 and the lateral passage 42.

Passage 42 extends angularly upwardly to communication with a valve chamber 55 which may be positioned parallel to the valve chamber 34 and in a corresponding position near the opposite side of the casing. Chamber 55 contains valve member 56 similarly mounted and vertically operable by means of a downwardly projecting valve stem 58.

A passage 60 similar in arrangement to the passage 52 connects the valve chambers 14, 55 and terminates at its lower end in a valve seat portion 62 against which the valve 56 is adapted to bear when it is in its upper position. When in its lowered position, the valve 56 bears against a bottom seat 64 carried by a cage portion 66 analogous to the cage portion 48 previously described, the space 68 under the valve and within the cage communicating through the orifices 70 in the cage with a chamber 72 and an outlet port 74 to which a suitable conduit is adapted to be connected.

The valves 35 and 56 are urged downwardly by helical compression springs 77, 79, which may be mounted upon their respective valve stems 44, 58 outside the casing to urge the stems and valves downwardly as shown.

The valve construction illustratively depicted herein is designed for air operation and to control the action of a reversible air motor such as is employed to drive a rotatable soot blower. It will be understood that the soot blower may be of the type which is also projectable, and that the projection and retraction thereof may also be powered by the same air motor, or by a separate air motor. In Figure 5, I have diagrammatically shown the principal related components of a control system for such a soot blower. A suitable soot blower construction is shown in my copending application Serial No. 766,183, filed August 5, 1947, and in Howse Patent No. 2,442,045, while the other components of the control system are disclosed in a copending application of Curtis L. Howse, Serial No. 88,854, filed April 21, 1949, now Patent No. 2,565,689.

As shown in Figure 5, a source of air pressure, shown as a tank 80, is connected to a diaphragm-operable valve 82 by means of a conduit 84, which is in turn connected to the inlet 33 of the valve casing 10 by a conduit 85. The valve casing also incorporates a port 86 extending through its front face and communicating with the valve chamber 12 and which is adapted to be connected by a conduit 88 to the air motor 90. A similar port 92 opening into the valve chamber 14 is adapted to be connected to the other terminal connection of the air motor 90 as by the conduit 94.

The outlet port 74 of the valve casing is connected by means of a conduit 73 to a pressure reducing orifice plate 75 which is in turn connected by a conduit 76 to a control valve generally designated 78.

The air pressure in the tank 80 may be at the desired motor operating pressure, which may be of the order of 80 lbs. per square inch, and this pressure may be maintained by any suitable means not necessary to consider here. Air under pressure from the tank is also led through a conduit 100 to a pressure reducing valve 102 which may drop the pressure to a suitable control pressure which may be of the order of 35 lbs. per square inch. A conduit 104 conducts reduced pressure air from the pressure reducing valve 102 to a port 105 of valve 78.

Port 105 is formed as a pocket in one end of valve casing 78 and contains a ball valve 106 which is urged by a spring 108 against a seat portion 110 formed at the bottom of the pocket. An axially drilled hole 112 extends longitudinally through the casing from the bottom of the pocket and a rod 114 is loosely fitted in the hole. The hole 112 communicates and is coaxial with a cylindrical chamber 115 formed in the opposite end of the casing. Chamber 115 contains a ball valve 116 adapted to seat against a seat portion 118 corresponding to seat portion 110, such seat portions forming the opposite extremities of the reduced central hole 112. The rod 114 is somewhat longer than the distance between the seats 110, 118, so that only one of the valve balls can be seated at a time. A central lateral port 120 communicates with the drilled hole 112 and conduit 76 is connected to this port. An exhaust port 122 connects the chamber 115 to atmosphere. A plunger 124 is slidable in chamber 115 and projects from the end of the casing. Plunger 124 is engageable by a pivoted actuating arm 125, normally urged away from the plunger by a compression spring 126, but the arm may be manually moved against the effort of this spring to swing pivotally inwardly about its fixed supporting pin 128 to urge the valve ball 116 against its seat, while at the same time unseating the ball 106 against the effort of the spring 108. When the arm 125 is released, it swings outwardly and valve 106 closes, while the valve 116 opens, being pushed off its seat by the spring 108 acting through the ball 106 and rod 114.

The valve is adapted to be held in the position in which valve 106 is opened, to establish communication between the reduced pressure air source from the reducing valve 102 and the conduit 126, by latching means including a latching dog 130 rockably mounted upon a pivot pin 132 and having a laterally projecting beveled end 134 engageable by and adapted to overengage the correspondingly beveled end 135 of the arm 125 when the arm is pushed into the position shown in Figure 5. A latch spring 136 of the tension type is shown connecting a lateral arm 138 formed integrally with the arm 130 to a fixed abutment, which may comprise the bellows diaphragm chamber 140. Chamber 140 may be mounted as a unit with the valve body 78 and contains a bellows diaphragm 142 having a head portion 144 to which a release pin 145 is attached. The release pin projects from one end of the casing 140. A spring 146 within the bellows diaphragm biases it to the extended condition in which the stem 145 is retracted. In such retracted position, the stem does not interfere with the latch position of the latch piece 130, but when the bellows diaphragm is collapsed, the pin is projected against the arm 138 and forces it and the connected latch portion 134 to a position to release the arm 125. The bellows diaphragm chamber within the casing 140 is connected by a conduit 150 to the conduit 76, so that when the pressure in line 76 is high enough, the bellows is collapsed and the latch piece moved to unlatched position.

The control assembly may also include means for connecting the reduced pressure air from the pressure reducing valve 102 to any one of several kick-off valves corresponding to the valve 78, and each such other kick-off valve may be connected to a system analogous to the one herein disclosed. The kick-off valve, when the unit is to operate, transmits the reduced pressure air, which may be of the order of 35 lbs. per square inch to the conduit 76. The conduit 76 is referred to as the "control line" and the reduced air pressure is referred to as the "control air." When the unit is to be started, the arm 125 is pushed in, as by pressure against the pad portion 127 formed thereon, to latch the valve 106 in the open position and the valve 116 closed. Control air pressure is then delivered to the line 76. The spring 146 in the bellows diaphragm is of such strength that the stem 145 cannot be projected to release the latch by the control air pressure. The control air enters the upper portion of the diaphragm chamber 106 of the diaphragm-operable valve 82 and opens such valve.

Upon the opening of valve 82, air from the tank 80 at higher pressure, which may be of the order of 80 lbs. per square inch, passes through the conduit 85 to the inlet 33 of valve casing 10. Valve 35 is at this time in the down position, and the air passes through passage 32 to cylinder 12 urging valve 22 to the right and holding it against its seat 25. The air leaves the cylinder 12 through the side outlet opening 86 thereof, from which it is conducted to the air motor 90 through conduit 88 to drive the motor in a direction which may be considered the forward direction. The air from the exhaust of the motor returns to the front opening 92 of valve casing 10 through conduit 94, enters cylinder 14, in which cylinder the valve 24 is off its seat 26 so that the air passes cylinder 14 and passage 15 to exhaust opening 16, from which its is discharged to atmosphere.

When the motor is to be reversed, valve 35 is moved upwardly, by pressure exerted upon its stem 44, and the valve then closes passage 32 by engagement with seat 36. The air entering the inlet 33 then passes under the valve and through passages 40, 42, over the valve 56 which is then in its lowered position, and into the outer end of cylinder 14 through passage 60. The pressure of this air maintains the valve 35 raised and tightly sealed against its seat 36 against the effort of the spring 77 and the valve 24 is moved to the left by the air entering cylinder 14. This unseats the valve 22 while sealing the valve 24 against the seat 26. The motor 90 is thereby reversed, air being delivered to the motor from the cylinder 14 through port 92 and conduit 94 and returned from the motor 90 to the exhaust port 16 by way of conduit 88, port 86, cylinder 12 and passage 15.

When reverse rotation of the motor is completed and it is desired to end the cycle of operation of the motor, valve 56 is lifted from its seat 64 into contact with the upper seat 62, valve 35 remaining in the up position. The air pressure then also maintains the valve 56 raised against its upper seat and the air passes under the valve 56 and through passage 68 to outlet port 74, no air then being delivered to the motor. From outlet port 74, the high pressure air is conducted through conduit 73 and an orifice member 75 to conduit 76 which is connected to the kick-off valve 78. As previously stated, the pressure during the operation of the motor and prior to the lifting of valve 56 is at a reduced value, which may be of the order of 35 lbs. per square inch, in the line 76, but upon the delivery of the high pressure air through the orifice member 75 to the line 76 in response to lifting of the valve 56, the pressure builds up in the line 76, and so in the line 150 and in bellows diaphragm casing 140. The spring 146 is so calibrated as to allow the stem 145 to be projected to release the latch when the pressure in the casing 140 reaches approximately 55 lbs. per square inch, which pressure can be developed through the orifice 75 when both of the valves 35, 56 are released. The stem 145 accordingly releases the latch piece 130 and the arm 125 swings outwardly closing the valve 106 and interrupting communication between the low pressure air source and line 76, and venting line 76 to atmosphere through port 120, passage 112, chamber 115, and exhaust port 122. When the pressure relief valve 116 opens, the line 76 is vented more rapidly than the pressure therein can be maintained through the orifice member 75, and the pressure accordingly drops in the diaphragm chamber 106 allowing the valve 82 to close and shutting off the high pressure air to the valve casing 10. Air delivery from the lower pressure source through the conduit 104 having previously been interrupted at valve 106, as stated, all air to the system is cut off, and when the pressure drops sufficiently, valves 35, 56 are pulled to their lowered positions by their springs 77, 79.

It will be appreciated that all of the valves and the plunger 145 are thus automatically reset so that whenever the low pressure or control air is again delivered to the line 76 through the valve 106, the diaphragm valve 82 is opened by such low pressure air, and air is again delivered to the valve casing 10 from the high pressure source to recommence the operating cycle. A normally open check valve 117 is connected by a branch conduit 119 to conduit 73. Check valve 117 closes when high pressure air is delivered thereto, but opens when the pressure in the line 73 is low. Check valve 117 is designed to be open when line 73 is at the control air pressure, which is of the order of 35–40 lbs. per square inch, and to be closed when the higher, motor-operating pressure of the order of 80 lbs. per square inch is present in line 73. If there should be any leakage past the valve 56 when the motor is operating, therefore, valve 117 prevents a build-up of pressure in control line 76.

At one extreme limit of the desired rotary movement of the motor 90, an arm 155 drivable by the motor strikes a plunger 156 engageable with a double-armed rocking lever 158 pivoted upon a fixed axis represented by a pin 160 in a position between and aligned with valve stem portions 44, 58. Lever 160 has stem actuating pad portions 162, 164 engageable with the lower extremities of the stems 44, 58 respectively. It may be assumed that it is desired always to start the motor when it is in a position corresponding to that in which the arm 155 is close to the plunger 156 and that arm 155 rotates clockwise from such position until it engages the plunger 166, forcing such plunger downwardly to rock the double arm lever 158 in a direction to lift stem 44 and valve 35. This reverses the motor, as previously explained, and the arm 155 accordingly reverses and turns counterclockwise until it engages the plunger 156, forcing the same downwardly to lift the stem 58 and valve 56. This stops the motor and diverts the high pressure air to the control line to trip the latch piece 130 and shut down the system. As the air escapes from the system and from the motor 90, the descent of the valve 56 returns the lever 158 and the plunger 156 to their inoperative positions shown in Figure 5, arm 155 being thereby moved slightly by the spring 79. It will be appreciated that the mechanical details of these valve actuating parts are subject to wide variation and are shown more or less diagrammatically, since in themselves they do not form a part of my present invention.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. Valvular controlling means comprising a valve body structure having a single inlet and three outlets, a diverting valve connected to the inlet and movable to connect said inlet to either of a pair of branching fluid conduit portions, means operatively connecting one of said branching conduit portions to one of said outlets, a second diverting valve connected to the other of said branching conduit portions and movable to connect said other branching conduit portion to either of the other two outlets, and two exhaust controlling valve elements, one connected to each of said branching conduit portions and each closable in response to increase of pressure in the branching conduit portion to which it is connected.

2. Means as defined in claim 1 wherein said exhaust controlling valve elements are mechanically connected by a force transmitting member movable by the closing of one of said elements to open the other.

3. Means as defined in claim 1 including a spring biasing the first mentioned diverting valve to a position to connect the first mentioned one of said branching conduit portions to the inlet and disconnect said other branching conduit portion from the inlet.

4. Means as defined in claim 1 including a spring biasing the first mentioned diverting valve to a position to connect the first mentioned one of said branching conduit portions to the inlet and disconnect said other branching conduit portion from the inlet, and spring means biasing the second diverting valve to a position to connect said other branching conduit portion to one of said other two outlets.

5. Means as set forth in claim 1 wherein that one of said exhaust controlling valve elements connected to said other branching conduit portion is connected thereto through the second diverting valve.

6. Valvular controlling means for regulating the starting and stopping and direction of movement of a fluid-driven motor or the like comprising a valve body having an inlet, an inlet diverting valve therein having a pair of outlets, said body having a fluid delivery port communicating with one of said outlets, a second diverting valve in said valve body having its inlet connected to the other of said outlets, said second diverting valve having a second pair of outlets, said body having another fluid delivery port communicating with one outlet of said second pair of outlets, said fluid delivery port being adapted to be connected to a reversible motor device or the like, said body having a first exhaust port and a second exhaust port, orifice portions connecting one of said exhaust ports to both of said fluid delivery ports, exhaust valve means arranged to alternatively close off communication between said last-mentioned exhaust port and either one or the other of said orifice portions, and means responsive to the pressure of fluid delivered to said outlets which communicate with said fluid delivery ports for shifting said exhaust valve means.

7. Means as set forth in claim 6 wherein said second mentioned diverting valve has one outlet connecting to said second exhaust port formed in the body.

8. Means as set forth in claim 6 wherein said exhaust valve means comprises a pair of mechanically interconnected three-way valves shiftable simultaneously to connect said last-mentioned exhaust port to one of said orifices while interrupting communication between said exhaust port and the other orifice.

9. Means as set forth in claim 6 including a spring biasing each of said diverting valves to a position providing communication between its inlet and the outlet thereof which communicates with one of said fluid delivery ports.

LE ROY S. DE MART.

REFERENCES CITED

The following references are of record in the file of this patent:

UNITED STATES PATENTS

| Number | Name | Date |
|---|---|---|
| 2,013,232 | Bridenbaugh | Sept. 3, 1935 |
| 2,354,960 | Morehouse | Aug. 1, 1944 |